United States Patent
Illsley et al.

(10) Patent No.: US 11,124,665 B2
(45) Date of Patent: Sep. 21, 2021

(54) ENERGY CURABLE COMPOSITIONS COMPRISING POLYMERIC AMINOACRYLATES

(71) Applicant: SUN CHEMICAL CORPORATION, Parsippany, NJ (US)

(72) Inventors: Derek Ronald Illsley, Bath (GB); Shaun Lawrence Herlihy, Glastonbury (GB); Sean Phillip Francis Mayers, Maidstone (GB)

(73) Assignee: Sun Chemical Corporation, Parsippany, NJ (US)

( * ) Notice: Subject to any disclaimer, the term of this patent is extended or adjusted under 35 U.S.C. 154(b) by 127 days.

(21) Appl. No.: 16/082,696

(22) PCT Filed: Mar. 14, 2017

(86) PCT No.: PCT/US2017/022224
§ 371 (c)(1),
(2) Date: Sep. 6, 2018

(87) PCT Pub. No.: WO2017/160784
PCT Pub. Date: Sep. 21, 2017

(65) Prior Publication Data
US 2019/0085196 A1    Mar. 21, 2019

Related U.S. Application Data

(60) Provisional application No. 62/310,126, filed on Mar. 18, 2016.

(51) Int. Cl.
| | | |
|---|---|---|
| *C09D 11/38* | (2014.01) |
| *C09D 4/00* | (2006.01) |
| *C09D 11/101* | (2014.01) |
| *C08F 220/28* | (2006.01) |
| *C08F 220/34* | (2006.01) |
| *C08F 220/36* | (2006.01) |
| *C09D 11/322* | (2014.01) |
| *C08F 2/48* | (2006.01) |

(52) U.S. Cl.
CPC .......... *C09D 11/38* (2013.01); *C08F 220/282* (2020.02); *C08F 220/283* (2020.02); *C08F 220/34* (2013.01); *C08F 220/346* (2020.02); *C08F 220/36* (2013.01); *C09D 4/00* (2013.01); *C09D 11/101* (2013.01); *C08F 2/48* (2013.01); *C08F 220/281* (2020.02); *C08F 2800/20* (2013.01); *C09D 11/322* (2013.01)

(58) Field of Classification Search
CPC .............. C08F 220/283; C08F 220/282; C08F 220/281; C08F 220/36; C08F 220/34; C09D 11/38
See application file for complete search history.

(56) References Cited

U.S. PATENT DOCUMENTS

| | | | |
|---|---|---|---|
| 3,844,916 A | 10/1974 | Gaske | |
| 3,914,165 A | 10/1975 | Gaske | |
| 3,925,349 A | 12/1975 | Gaske | |
| 4,284,776 A | 8/1981 | Grubber et al. | |
| 5,482,649 A | 1/1996 | Meixner et al. | |
| 6,806,032 B2* | 10/2004 | Takanashi | G03F 7/027 430/288.1 |
| 2007/0004815 A1* | 1/2007 | Narayan-Sarathy | B01J 19/123 522/1 |
| 2009/0098304 A1 | 4/2009 | Stone et al. | |
| 2009/0099279 A1* | 4/2009 | Carroy | C08F 290/061 522/173 |
| 2009/0318611 A1 | 12/2009 | Bergiers et al. | |
| 2010/0041784 A1* | 2/2010 | Loccufier | C08F 2/50 522/26 |
| 2010/0048756 A1 | 2/2010 | Loccufier et al. | |
| 2015/0376424 A1 | 12/2015 | Illsley et al. | |

FOREIGN PATENT DOCUMENTS

| | | |
|---|---|---|
| EP | 1731541 | 12/2006 |
| JP | 2008-280383 A | 11/2008 |
| WO | WO 2015/148094 | 10/2015 |
| WO | WO 2017095786 A1 | 6/2017 |

OTHER PUBLICATIONS

IGM Resins "UV/EB readcure Product Guide", 2015. IGMResins, accessed online Mar. 21, 2020 at http://www.chemwinfo.com/private_folder/Uploadfiles2016_August/IGM_RESINS_PRODUCTS_GUIDES_140693-1.pdf, pp. 1-47. (Year: 2015).*
International Search Report issued in International Application No. PCT/US17/022224, dated May 31, 2017.
Written Opinion of the International Searching Authority issued in International Application No. PCT/US17/022224, dated May 31, 2017.
L.M. Tang (Polymer Journal (Tokyo) (2005), 37(4), 255-261.
Extended European Search Report issued in counterpart EP application No. 17767300.1 dated Oct. 15, 2019.
International Preliminary Report issued in PCT/US2017/022224 dated Sep. 18, 2018.

* cited by examiner

*Primary Examiner* — Ling Siu Choi
*Assistant Examiner* — David L Miller
(74) *Attorney, Agent, or Firm* — Marian E. Fundytus; Ostrolenk Faber LLP.

(57) ABSTRACT

The present invention provides energy-curable compositions comprising aminoacrylates produced by the Michael addition reaction of any blend of highly alkoxylated monomers with any blend of mono- and/or bireactive amines. Suitable highly alkoxylated monomers include, but are not limited to, poly(ethylene glycol) diacrylates, poly(propylene glycol) diacrylates, and ethoxylated trimethylolpropane triacrylates. The alkoxylated monomers have a degree of alkoxylation equal to or greater than 2.0 per functional group. The compositions of the present invention further comprise greater than 10% (w/w) of any blend of monomers having molecular weights of less than 1000 Daltons.

23 Claims, No Drawings

ENERGY CURABLE COMPOSITIONS COMPRISING POLYMERIC AMINOACRYLATES

CROSS REFERENCE TO RELATED APPLICATIONS

The present application is a § 371 National Phase application based on PCT/US2017/022224 filed Mar. 14, 2017, which claims the benefit of U.S. Provisional Application No. 62/310,126, filed 18 Mar. 2016, the subject matter of each of which is incorporated by reference in their entirety.

FIELD OF THE INVENTION

The present invention is related to low migration energy curable compositions. The compositions comprise aminoacrylates and greater than 10% (w/w) of low molecular weight monomers. The aminoacrylates are Michael addition products of highly alkoxylated acrylate monomers and amines.

BACKGROUND

Aminoacrylates, formed by the Michael reaction of (meth)acrylates with primary and secondary amines are known, and a broad range are commercially available. Such aminoacrylates are considered as co-initiators in the energy curing of free radically polymerizable compositions. They serve as hydrogen donors for type 2 photoinitiators, such as benzophenone and thioxanthone types, and they also help to overcome the effects of oxygen inhibition. The latter property is particularly important in low viscosity fluids such as those used in inkjet printing, where oxygen can readily diffuse into the printed ink prior to it being cured under the action of a radiation source. Aminoacrylates act, again by hydrogen transfer to stable peroxy radicals, to reform active initiating species thereby helping to overcome the effects of oxygen inhibition.

U.S. Pat. Nos. 3,844,916; 3,914,165; and 3,925,349 describe how non-gelled Michael addition reaction products are obtained by reacting amines comprising at least one amino hydrogen atom with a stoichiometric excess of ethylenic material comprising a polyacrylate. It is interesting to note that it was observed that these reaction products were found not to be inhibited by oxygen, very much a benefit for the inclusion of these types of products into energy-curable inkjet fluids cured in air.

WO 2015/148094 describes the use of highly alkoxylated monomers in energy-curable low migration fluids, especially those intended for the printing of food packaging. A conventional aminoacrylate, CN3715 (ex. Sartomer) was used.

EP 1731541 describes the preparation of aminoacrylates from (meth)acrylated ethoxylated/propoxylated polyols with primary and/or secondary amines to produce compounds having a reduced tendency to migrate from cured compositions. EP1731541 teaches that low molecular weight monomers, such as hexanediol diacrylate (HDDA) and trimethylolpropanetriacrylate (TMPTA), should be used at less than 10% (w/w) and more preferably less than 5% (w/w) of the energy-curable composition.

US 2010/0048756 describes the preparation and use of aminoacrylates from the reaction of difunctional acrylate monomers and (bireactive) primary amines in improving the adhesion to plastic substrates.

US 20070004815 describes the synthesis of a urethane acrylate formed from a diol precursor produced by the Michael addition reaction of HDDA and a molar excess of ethanolamine. The diol precursor is subsequently reacted with diisocyanates and hydroxyl-functional acrylate to form the polyurethane acrylate.

L. M. Tang (Polymer Journal (Tokyo) (2005), 37(4), 255-261 describes how hyperbranched polymers can be formed by the controlled Michael reaction of TMPTA and piperazine, a bireactive amine.

U.S. Pat. No. 5,482,649 describes that an aminoacrylate formed by the reaction of trimethylolpropane triacrylate having 15 moles ethoxylation with ethanolamine is deemed to have poor reactivity, and poor solvent resistance of the UV cured film.

SUMMARY OF THE INVENTION

The present invention is directed to low migration energy curable compositions. The compositions comprise aminoacrylates that are the Michael additions products of highly alkoxylated monomers and amines. The compositions of the invention are useful as printing inks and coatings. The compositions of the invention are suitable for printing or coating substrates and articles that are to be used for food packaging, packaging for pharmaceutical products, and the like, where it is desirable that the food or product is not contaminated with components of the printed ink or coating.

The inventors have found that the use of polymeric aminoacrylates, according to the current invention, is surprisingly effective when incorporated into energy-curable compositions comprising significant concentrations of low molecular weight monomers. Thus, this makes them suitable for the preparation of compositions where low migration is required, such as the printing of food packaging or pharmaceutical product packaging. This feature of the inventive use of such polymeric aminoacrylates makes them useful for energy-curable inkjet and flexographic inks, where the incorporation of such low molecular weight, low viscosity monomers enables the preparation of low viscosity energy-curable compositions.

In a particular aspect, the present invention provides an energy curable composition comprising:
- a) greater than 10% (w/w) of one or more low molecular weight monomers having molecular weights of less than 1000 Daltons, and at least one polymerizable group.
- b) 0.5% to 50% (w/w) one or more aminoacrylates that are the Michael reaction products of polymerizable alkoxylated (meth)acrylated monomers or oligomers, with primary and/or secondary amines;
  - i. wherein the alkoxylated (meth)acrylate monomers or oligomers have at least one alkoxylated chain, and at least 2 polymerizable groups per molecule; and
  - ii. wherein the degree of alkoxylation per polymerizable group is greater than or equal to 2.

In one embodiment, the amount of migration of uncured monomer out of the cured composition into any packaged produce or product is less than or equal to 50 parts per billion.

In another embodiment, the amount of migration of uncured monomer out of the cured composition into any packaged produce or product is less than or equal to 10 parts per billion.

In certain embodiments, the present invention provides a method to reduce the amount of migratable monomer in a cured ink or coating composition, and a process for preparing an article with a low migration ink or coating.

The present invention also provides articles comprising the energy curable compositions of the invention.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

Disclosed are energy curable compositions comprising polymeric aminoacrylates produced by the Michael addition reaction of any blend of highly alkoxylated monomers, such as poly(ethylene) glycol diacrylates, poly(propylene) glycol diacrylates, and ethoxylated trimethylolpropane triacrylates, with any blend of mono- and bireactive amines, wherein the monomer has a degree of alkoxylation per polymerizable group equal to, or greater than, 2.0. The compositions of the invention further comprise greater than 10% (w/w) of any blend of monomers having molecular weights of less than 1000 Daltons.

The compositions of the invention may optionally comprise any blend of photoinitiators, including polymeric, polymerizable, and multifunctional types.

The compositions of the invention include inkjet and flexographic ink and coating compositions, and may be cured under the action of any radiation source, including UV and electron beam.

According to the present invention, the incorporation of aminoacrylates, formed by the reaction of highly alkoxylated monomers such as ethoxylated or propxylated trimethylolpropane triacrylates, polyethylene glycol diacrylates, and polypropylene glycol diacrylates, with mono- and bireactive amines, into energy-curable (free radical) compositions produce low levels of uncured monomer in the cured composition.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer" or "monomers" is intended to include both monomers and oligomers, or mixtures thereof.

As used herein, the terms "inks and coatings," "inks," "compositions" and "fluids" are used interchangeably.

As used herein, a "bireactive amine" refers to any compound comprising one primary or two secondary amine groups which has the capacity to react with two acrylate groups. The bireactive amine may further comprise any number of further tertiary amine groups, which would not participate in a Michael addition reaction with acrylate.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

As used herein, "low migration" refers to the level of contamination of any packaged produce or product being less than 50 parts per billion (ppb) of any particular uncured monomer that may leach out of the ink or coating once it is cured on the substrate. 'Low migration' further means that contamination by photoinitiator residues should also be less than 50 ppb, or less than the specific migration limit existing for any specific photoinitiator. The compositions of the current invention lend themselves to applications where higher conversion of monomer via energy curing is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material that could leach ('migrate') out of the ink into the surrounding environment thereby causing unwanted contamination. This is of particular concern for food packaging where any contamination of the packaged food from undesirable, migratable, ink components should be minimized. For energy-curable inkjet compositions significant concentrations, certainly greater than 10% (w/w), of low molecular weight low acrylate functionality monomers such as dipropylene glycol diacrylate ('DPGDA') and hexanediol diacrylate ('HDDA') have to be used to achieve the low viscosities required of these inks. Such monomers have lower reactivity, in terms of their capacity to react into an energy-curing composition, than the higher molecular weight and higher functionality monomers and oligomers typical of flexographic and particularly offset compositions. Therefore, any means to increase the conversion of such low molecular weight, low functionality monomers, during energy curing would be advantageous for the aforementioned sensitive printing applications. This is achieved by the compositions prepared according to the current invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "optionally substituted" means that the subtituent or molecule may be substituted or unsubstituted.

Throughout this disclosure, all parts and percentages are by weight (wt % or mass % based on the total weight) and all temperatures are in ° C. unless otherwise indicated.

Energy-Curable Compositions

The current invention covers energy-curable compositions comprising greater than 10% (w/w) of oligomers and/or monomers with molecular weights of less than 1000 Daltons. The present invention shows for the first that polymeric aminoacrylates formed by the Michael reaction of stoichiometric excesses of poly(ethylene) glycol or poly (propylene) glycol diacrylate with bireactive amines, have the capacity to reduce the amount of uncured monomer in energy cured (free radically polymerizable) coatings compared with those currently commercially available aminoacrylates.

In a particular aspect, the present invention provides an energy curable composition comprising:
  a) greater than 10% (w/w) of one or more low molecular weight monomers having molecular weights of less than 1000 Daltons, and at least one polymerizable group.
  b) 0.5% to 50% (w/w) one or more aminoacrylates that are the Michael reaction products of polymerizable alkoxylated (meth)acrylated monomers or oligomers, with primary and/or secondary amines;
    i. wherein the alkoxylated (meth)acrylate monomers or oligomers have at least one alkoxylated chain, and at least 2 polymerizable groups per molecule; and
    ii. wherein the degree of alkoxylation per polymerizable group is greater than or equal to 2.

Applicants have surprisingly found that the use of the polymeric aminoacrylates of the invention in energy-curable compositions, where the polymerizable component consists predominantly of lower molecular weight monomers, produces low levels of uncured monomer after energy curing. The levels of uncured monomer for compositions comprising such polymeric amino acrylates are significantly lower than for those compositions where the aminoacrylate is produced from monomers having low levels of alkoxylation. This feature is especially useful in the preparation of ink and coating compositions, such as those compositions for the printing of food packaging, where the amount of uncured monomer should be limited to prevent the risk of unwanted contamination of the foodstuff. For the preparation of inkjet compositions, where the polymerizable component consists largely of difunctional monomers having molecular weights of less than 500 Daltons, this feature of the current invention is especially useful.

Energy curable compositions comprising aminoacrylates, according to the current invention, produce significantly lower levels of uncured monomer after curing than commercially available aminoacrylates, even those specified for low migration applications. This cannot arise solely from the acrylate and amine functionality of the aminoacrylates used in the inventive compositions. The high degree of alkoxylation must also contribute to the lowering of unreacted monomer in energy cured inks and coatings.

A particularly surprising finding of the current invention is the effective result achieved with aminoacrylates formed by the reaction of polyethylene glycol (PEG) or polypropylene glycol (PPG) diacrylates and bifunctional amines, especially alkanolamines. However, the present invention is not limited to these, and covers any energy curable compositions where the concentration of low molecular weight monomer is greater than 10% (w/w), and which further comprises an aminoacrylate formed by the reaction of a highly alkoxylated monomer with any blend of mono- and bireactive amine.

It is clear that energy curable compositions comprising greater than 10% (w/w) of monomers having molecular weights of less than 1000 Daltons will enable lower viscosity compositions suitable, for example, for flexographic and inkjet printing, to be achieved. Particularly in the case of essentially solvent-free inkjet compositions, the major part of the ink composition needs to be made up of such low molecular weight monomers to enable the sufficiently low viscosities of the ink to be achieved. Therefore, inkjet and flexographic compositions according to the current invention which comprise aminoacrylates formed by the Michael reaction of highly alkoxylated (acrylate) monomers and mono- and bireactive amines, are particularly suitable for the printing of sensitive applications, such as the printing of food packaging, pharmaceutical packaging, personal care, and household packaging.

Compositions of the current invention comprising the Michael reaction products of highly alkoxylated monomers with mono- and bireactive amines deliver much lower levels of uncured monomer after energy curing than with compositions comprising aminoacrylates produced from monomers having degrees of alkoxylation per polymerizable group of less than 2.

The compositions of the current invention lend themselves to applications where higher conversion of monomer via energy curing is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material that could leach ('migrate') out of the ink into the surrounding environment, thereby causing unwanted contamination. This is of particular concern for food packaging, where any contamination of the packaged food from undesirable, migratable, ink components should be minimized. For energy-curable inkjet compositions significant concentrations, certainly greater than 10% (w/w), of low molecular weight low acrylate functionality monomers such as dipropylene glycol diacrylate ('DPGDA') and hexanediol diacrylate ('HDDA') have to be used to achieve the low viscosities required of these inks. Such monomers have lower reactivity, in terms of their capacity to react into an energy-curing composition, than the higher molecular weight and higher functionality monomers and oligomers typical of flexographic and particularly offset compositions. Therefore, any means to increase the conversion of such low molecular weight, low functionality monomers during energy curing would be advantageous for the aforementioned sensitive printing applications. This is achieved by the compositions prepared according to the current invention.

Energy-curable compositions of the current invention preferably comprise greater than 10% (w/w) of monomers having molecular weights less than 1000 Daltons, and further comprise aminoacrylates produced by the Michael addition reaction of highly alkoxylated (acrylate) monomers with mono- and bireactive amines. The highly alkoxylated monomers (or oligomers) comprise an alkoxylated chain where the degree of alkoxylation per polymerizable group is 2 or greater, and where the average number of polymerizable groups per molecule is 2 or greater. The poly(alkylene oxide) cores of the highly alkoxylated monomers (and oligomers) used in the preparation of the aminoacrylates of the invention can be defined by the following formula:

$(C_nH_{2n}O)_x$ where n can be between 1 and 6, and x is between 2 and 40.

The compositions of the invention can comprise aminoacrylates produced from any highly alkoxylated monomer (or oligomer) that fits the foregoing description. Examples of such highly alkoxylated monomers (or oligomers) include, but are not limited to: poly(ethylene glycol) diacrylates (PEGDA), poly(propylene glycol) diacrylates (PPGDA), ethoxylated trimethylolpropane triacrylate (TMPEOTA), propoxylated trimethylolpropane triacrylate (TMPPOTA), ethoxylated pentaerythritol tri- and tetraacrylate (PPTTA), propoxylated pentaerythritol tri- and tetraacrylate (PPOTTA). It should be appreciated by those skilled in the art that, as well as the highly alkoxylated monomers already mentioned, other acrylate (or methacrylate) monomers and oligomers may also be used in any combination in producing the polymeric aminoacrylates which form part of the compositions of the current invention.

It should be appreciated that any combination of any aminoacrylate formed from any blend of highly alkoxylated monomers and oligomers with a combination of any mono- and bireactive amine can be used in the preparation of compositions according to the current invention. For example, it could be conceived that a 2-stage process where a 2-fold stoichiometric, or greater, excess of bireactive amine is reacted with a tri-, or higher functional acrylate core in the first step is followed by reaction with poly(alkylene oxide) diacrylates in a second step.

Any amines which are either monoreactive or bireactive in respect of their reactivity in the Michael reaction with acrylate can be used, and include any blend of compounds comprising either one secondary, or one primary amine, and those compounds comprising two secondary amine groups. Such amines include, but are not limited to, any blend of secondary alkylamines, secondary alkanolamines, primary alkylamines, primary alkanolamines and cyclic amines such as piperazine. Particularly preferred amines are alkanolamines and piperazine. Alkylamines and alkanolamines are described by the following formula:

$H_nNRR'$ wherein n=1 or 2 and R (and R') are each independently an alkyl, optionally substituted by hydroxy, alkoxy, tertiary amine and/or aryl.

Cyclic difunctional amines include piperazine, and higher homologues thereof may also be used.

Suitable amines include, but are not restricted to: diethylamine, dipropylamine, dibutylamine, diisobutylamine, dihexylamine, ethylamine, propylamine, isopropylamine, butylamine, isobutylamine, hexylamine, octylamine, 2-ethylhexylamine, cyclopentylamine, cyclohexylamine, benzylamine, 2-ethoxyethylamine, 3-ethoxypropylamine, ethanolamine, propanolamine, butanolamine, diethanolamine, dipropanolamine, ethanolamine, propanolamine, butanolamine, 2-dimethylaminoethylamine, 2-diethylaminoethylamine, 3-dimethylaminopropylamine, 4-(2-aminoethyl)morpholine and piperazine. It is also possible to use higher functional amines, such as tri-reactive, tetra-reactive and hexa-reactive types with respect to reactivity in a Michael addition reaction. However, mono- and bireactive types are preferred. Any combination of one or more amines may be used in the preparation of the polymeric aminoacrylates used in compositions of the current invention. It should be appreciated by those skilled in the art that any amine that is capable of reacting with acrylate may be used. It should also be understood that any blend of amines may be used in the preparation of the aminoacrylates forming part of the compositions according to the invention.

The Michael reaction between acrylates and amines can proceed in the absence of solvent and catalyst. However, to accelerate the reaction the use of catalysts is common, such as 1,8-diazabicycloundec-7-ene (DBU). It is common practice to apply gentle heating (typically 30-80° C.) during the preparation of aminoacrylates; the inventors have used a reaction temperature of 50° C. Although not necessary, the reaction can be carried out under an inert atmosphere such as nitrogen. It is preferred that the amine is added to the acrylate, as this ensures that an excess of acrylate is present throughout the reaction. However, it is also conceivable that the acrylate may be added to the amine. The only stipulation for the Michael reaction according to the current invention is that a molar excess of the highly alkoxylated monomer (or oligomer), with respect to acrylate, is used. The end point of the reaction is determined as the point where no increase in viscosity has been observed for a period of 30 minutes. There is no restriction on the molar ratio of the highly alkoxylated monomers to the amine of the current invention, so long as an excess of the monomer is used. However, amine values of the final product greater than 10 mg KOH/g, preferably greater than 20 mg KOH/g are desirable. There is no upper limit on the maximum amine value of the polymeric aminoacrylates of the current invention other than that limited by the maximum preferred molar ratio of highly alkoxylated monomer to amine.

Typical structures of the aminoacrylates used in compositions of the current invention include, but are not limited, to:

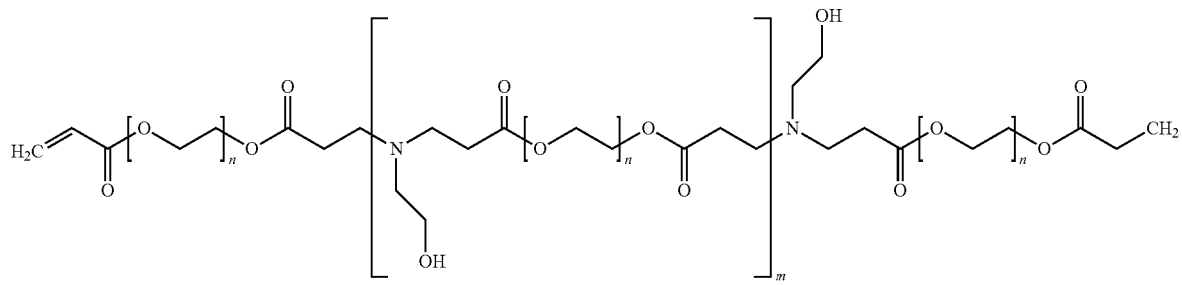

(representative of the aminoacrylate of inventive inks 6, 7, 8, 9, 10 and 12)

-continued

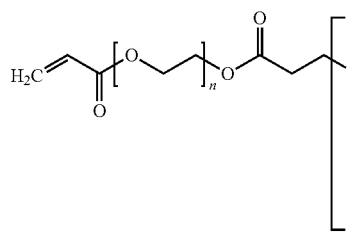 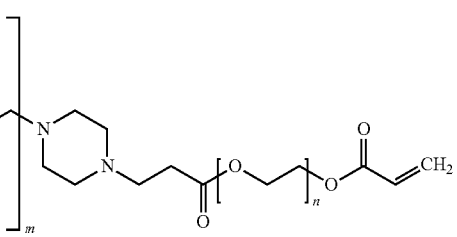

(representative of the aminoacrylate of inventive ink 11)

In the above illustrative examples, n=2 to 45, and m=0 or an integer greater than or equal to 1.

A most surprising finding with compositions comprising aminoacrylates according to the current invention is that they produce significantly lower amounts of uncured monomer in energy-cured compositions than those Michael adducts produced from monomers having low levels of alkoxylation. This is ascribed, in part, to the ability of these aminoacrylates to act as 'vitrification control' monomers. This is a theory expounded in WO 2015/148094. The accepted state-of-the-art practice in delivering the lowest level of monomer migratables, or put another way the highest conversion of monomer during UV-cure, is to incorporate monomers or oligomers having high polymerizable group (principally acrylate) functionality. That is, species having 3 or more polymerizable groups per molecule; such as the penta and hexaacrylated adducts of dipentaerthyritol. This accepted practice presumes that higher acrylate, or other polymerizable group, functionality of the monomer or oligomer results in higher crosslink density and thence reduced levels of unbound monomer. On consideration of this state of the art it is clear that high acrylate functionality by itself cannot lead to increased levels of monomer (polymerisable) group conversion. Merely raising the acrylate functionality of a portion of the monomers/oligomers in a UV-curable ink composition would have little effect on the polymerization kinetics of the curing ink film if the acrylate concentration in the ink remains little changed. Thus, if a monofunctional acrylate monomer, for example, was incorporated into a UV-curable ink then the likelihood of this monomer becoming bound into the cured ink film would remain the same whether a multifunctional monomer/oligomer was introduced or not. However, if the multifunctional monomer/oligomer enabled an increase in the acrylate concentration (acrylate groups per unit volume) then this would have a potentially increasing effect on the rate of polymerization which could lead to increased conversion levels and hence reduced amounts of unbound monomer which might then be free to migrate from the cured ink film and cause contamination of any packaged produce. The inventors have found that in compositions of the current invention using aminoacrylates derived from highly alkoxylated monomers where the functionality can be low (2), but also the acrylate concentration in a composition is reduced, leads to a surprising lowering of the amount of uncured monomer present when the composition is energy-cured. It is this feature of the invention that provides significant advantage to the formulation of compositions comprising high concentrations of low molecular weight, low functionality monomers, such as inkjet and flexographic inks and varnishes.

The applicants do not wish to be bound to any particular theory but postulate that this beneficial effect results from the aminoacrylates used in compositions of the current invention enabling greater segmental mobility in the energy-curing composition allowing more residual unsaturated (monomer) sites to be available for polymerization, leading to higher conversion of the monomers and oligomers. Another way of putting this is that without the aminoacrylates of the invention a point of virtual 'vitrification' is reached during cure where unreacted monomer groups cannot come into sufficiently close proximity so that they can react with each other. Indeed, where highly functional monomers such as dipentaerythritol pentaacrylate and hexaacrylate are used it is likely that their incorporation could lead to such a 'vitrified' state at relatively low polymerizable group (acrylate) conversion, even though they themselves might be bound into the cured ink film. After all, only one acrylate group per molecule has to react with that of another monomer molecule for it to become bound into the cured ink film.

In certain embodiments, the aminoacrylates may be present in the ink composition in an amount of 0.5% to 50% (w/w), based on the total weight of the composition. For example, the aminoacrylates may be present in an amount of 0.5% to 45%; or 0.5% to 40%; or 0.5% to 35%; or 0.5% go 30%; or 0.5% to 25%; or 0.5% to 20%; or 0.5% to 15%; or 0.5% to 10%; or 0.5% to 5%; or 0.5% to 1%; or 1% to 50%; or 1% to 45%; 1% to 40%; or 1% to 35%; or 1% to 30%; or 1% to 25%; or 1% to 20%; or 1% to 15% or 1% to 10%; or 1% to 5%; or 2% to to 50%; or 2% to 45%; or 2% to 40%; or 2% to 35%; or 2% to 30%; or 2% to 25%; or 2% to 20%; or 2% to 15%; or 2% to 10%; or 2% to 5%; or 5% to 50%; or 5% to 45%; or 5% to 40%; or 5% to 35%; or 5% to 30%; or 5% to 25%; or 5% to 20%; or 5% to 15%; or 5% to 10%; or 10% to 50%; or 10% to 45%; or 10% to 40%; or 10% to 35%; or 10% to 30%; or 10% to 25%; or 10% to 20%; or 10% to 15%.

Compositions of the current invention, as well as the aforementioned aminoacrylates, also comprise any blend of low molecular weight monomers having molecular weights less than 1000 Daltons, with the proviso that the concentration of such monomers is greater than 10% (w/w). For inkjet compositions which are essentially free of any diluting (non-reactive) solvent, it is preferable that the concentration of such monomers is greater than 50% (w/w) of the ink or varnish composition. For example, the concentration of low molecular weight monomers may be greater than 15%; or greater than 20%; or greater than 25%; or greater than 30%; or greater than 35%; or greater than 40%; or greater than 45%. There is no restriction on the nature or amount of the monomers used in the preparation of compositions of the current invention, other than those previously stipulated. A listing of suitable monomers that may be used in the preparation of compositions according to the current invention is provided below.

Compositions prepared according to the current invention are particularly suited to curing under the action of UV light and/or electron-beam although it should be appreciated that any electromagnetic radiation source producing an actinic effect may be used.

Where compositions comprising any blend of aminoacrylates of the current invention are cured under the action of UV-light then photoinitiators may be included in the composition. There is no restriction on the type, blend or concentration of photoinitiator used and can include any suitable type of photoinitiators, such as, but not limited to: α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyl-diphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(Ŋ 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist, additional to the polymeric aminoacrylates of the present invention, may also optionally be included in the formulation. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino) benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

Where the compositions of the current invention are used in low migration applications it is preferred that photoinitiators having low migration potential are used. Therefore, polymeric, polymerizable and multifunctional types are preferred.

When present, the photoinitiators are typically present in an amount of 0.1% to 15% (w/w), based on the total weight of the composition. For example, the photoinitiators may be present in an amount of 0.1% to 10%; or 0.1% to 5%; or 0.1% to 1%; or 0.1% to 0.5%; or 0.5% to 15%; or 0.5% to 10%; or 0.5% to 5%; or 0.5% to 1%; or 1% to 15%; or 1% to 10%; or 1% to 5%.

Compositions according to the invention may comprise any amount of any blend of additional free radically polymerizable monomers and oligomers, other than the aminoacrylate, so long as the amount of monomers having a molecular weight less than 1000 Daltons is greater than 10% (w/w) of the total composition. For example, the concentration of low molecular weight monomers may be greater than 15%; or greater than 20%; or greater than 25%; or greater than 30%; or greater than 35%; or greater than 40%; or greater than 45%; or greater than 50%.

Examples of suitable monofunctional and multifunctional ethylenically unsaturated monomers include, but are not limited to, those listed below, and combinations thereof, where the terms ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Equivalent methacrylate compounds are also capable of being used, although those skilled in the art will appreciate that methacrylate compounds have lower reactivity than their equivalent acrylate counterparts.

Suitable monofunctional ethylenically unsaturated monomers include, but are not limited to: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; and combinations thereof.

Suitable multifunctional ethylenically unsaturated monomers include, but are not limited to: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate; and combinations thereof.

Examples of monomers comprising free radically polymerizable groups other than acrylate include N-vinyl amides, vinyl ethers and vinyl esters. Examples of N-vinyl amides include, but are not limited to, N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide (VIMA) or acryloyl morpholine (ACMO), and combinations thereof. Examples of vinyl ethers and vinyl esters include, but are not limited to; 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether; iso-butyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1-4, cyclohexanedimethanol divinyl ether (CHDM-di); hydroxybutyl vinylether (HBVE); 1-4-cyclohexanedimethanol monovinyl ether (CHDM-mono); 1,2,4-trivinylcyclohexane (TVCH); vinylphosphonic acid dimethylester (VPA); or vinylphosphonic acid dimethyl ester (VPADME); and combinations thereof.

As well as free radically-polymerisable monomers the inventive polymeric aminoacrylates may also be compounded with any concentration and type of free-radically polymerizable oligomer, including but not restricted to polyurethane acrylates, polyester acrylates, polyether acrylates and epoxy acrylates.

Where the compositions of the current invention are used for applications requiring low migration, it is preferred that the total concentration of monofunctional monomer is less than 10% (w/w), preferably less than 5% (w/w), or less than 3% (w/w), or less than 2% (w/w), or less than 1% (w/w), and most preferably essentially free of any monofunctional monomer.

Where the compositions of the invention require colorants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

When present, organic pigments and dyes are typically present in an amount of about 0.1% to about 7% (w/w), based on the total weight of the composition. For example, the organic pigments and dyes may be present in an amount of 0.1% to 6.5%; or 0.1% to 6%; or 0.1% to 5.5%; or 0.1% to 5%; or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 7%; or 0.5% to 6.5%; or 0.5% to 6%; or 0.5% to 5.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%; or 1% to 7%; or 1% to 6.5%; or 1% to 6%; or 1% to 5.5%; or 1% to 5%; or 1% to 4.5%; or 1% to 4%; or 1% to 3.5%; or 1% to 3%; or 1% to 2.5%; or 1% to 2%; or 1% to 1.5%.

When present, inorganic pigments are typically present in an amount of 10% to 40% (w/w), based on the total weight of the composition. For example, the inorganic pigments may be present in an amount of 10% to 35%; or 10% to 30%; or 10% to 25%; or 10% to 20%; or 10% to 15%; or 15% to 40%; or 15% to 35%; or 15% to 30%; or 15% to 25%; or 15% to 20%; or 20% to 40%; or 20% to 35%; or 20% to 30%; or 20% to 25%.

The energy-curable compositions of the invention may also contain other components which enable them to perform in their intended application. These other ink components include, but are not restricted to, stabilizers, wetting aids, slip agents, inert resins, antifoams, fillers, rheological aids, amine synergists, etc. When present, these other components are typically present in an amount of about 0.1% to about 5% (w/w), based on the total weight of the composition. For example, these other components may be present in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%; or 1% to 5%; or 1% to 4.5%; or 1% to 4%; or 1% to 3.5%; or 1% to 3%; or 1% to 2.5%; or 1% to 2%; or 1% to 1.5%.

The energy-curable compositions of the invention may also optionally comprise any blend of acrylic polymer or copolymer which is dissolved into it. These polymers are usually prepared by the (thermal) free radical polymerization of blends of monomers including, but not restricted to, styrene, butyl (meth)acrylate, ethyl (meth)acrylate, methyl (meth)acrylate, isobutyl (meth)acrylate. The acrylic polymer preferably has an average molecular weight of less than 20,000 g/mole and more preferably less than 10,000 g/mole. The molecular weight of such polymers can be measured by those techniques known in the art such as gel permeation chromatography. Examples of acrylic polymers include those supplied from Dianal, Elvacite Rohm and Haas and DSM, amongst others. The acrylic polymer or copolymer is preferably present in the compositions at a concentration of between 2% and 20% (w/w), based on the total weight of the composition. For example, the acrylic polymer or copolymer may be present in an amount of 2% to 15%; or 2% to 10%; or 2% to 5%; or 3% to 20%; or 3% to 15%; or 3% to 10%; or 3% to 5%; or 5% to 20%; or 5% to 15%; or 5% to 10%.

Compositions of the current invention are preferably essentially free of any solvent. However, if required, compositions of the current invention can be diluted with solvents. Both organic and aqueous solvents may be used to dilute the curable compositions of the invention. The preferred maximum amount of any solvent that could be included in an ink composition is 10% (w/w), based on the total weight of the composition. For example, when present, the maximum amount of any solvent may be 5%, or 2%, or 1%, or 0.5%, or 0.1%.

The energy-curable compositions prepared according to the invention are particularly suited to the preparation of inkjet and flexographic printing inks. They are also particularly effective in the preparation of energy-curable primers and overprint varnishes. In these applications the incorporation of the aminoacrylates according to the invention has been shown to be more effective than commercially available aminoacrylates, and especially so in energy-curable compositions requiring low migration. This feature is important for the printing or coating of, for example, food packaging, pharmaceutical packaging, displays in close proximity to foods, personal care packaging, toy packaging, etc.

Low migration energy-curable compositions according to the current invention are preferably cured under the action of electron-beam or UV light. In the latter case, the use of photoinitiators is required to effect the cure. For low migration UV-curable compositions, it is preferred that photoinitiators having recognized low migration potential are used. Any combination and concentration of low migration potential photoinitiators may be used, and types include, but are not restricted to, polymeric, polymerizable, difunctional, multifunctional photoinitiators. Both type I and type II photoinitiators within those classes are suitable. Suitable polymeric photoinitiators have been described above. Other photoinitiators suitable for low migration applications include: bis(2,4,6-trimethylbenzoyl) phosphine oxide; 1-[4-(2-hydroxyethoxy)-phenyl]-2-hydroxy-2-methyl-1-propane-1-one; oligo-[2-hydroxy-2-methyl-1-((4-(1-methylvinyl)phenyl) propanone]; poly(oxy-1,2-ethanediyl)-alpha-(4-(dimethylamino)benzoyl)-omega-((4-(dimethylamino) benzoyl)oxy)-(9Cl); 2-hydroxy-1-{4-[4-(2-hydroxy-2-methyl-propionyl)-benzyl]-phenyl}-2-methyl-propan-1-one; or 2-hydroxy-1-[4-(4-(2-hydroxy-2-methylpropionyl) phenoxy)phenyl]-2-methyl propan-1-one. It should be appreciated by those skilled in the art that the inventive polymeric aminoacrylates can be combined with any photoinitiator suitable for low migration applications. Such photoinitiators may include any of those listed in EUPIA's 'Suitability List of Photo-initiators for Low Migration UV Printing Inks and Varnishes', especially those in Group 1A and 1B.

Where energy-curable compositions are applied to the (non-contact) surface of primary or secondary packaging intended for foodstuffs, then any contamination from the package impacting the foodstuff should fall within the guidelines set out by Article 3 of Regulation (EC) No 1935/2004, as recommended by EUPIA. The regulations stipulate that any materials and articles in contact with food:

a. "shall be manufactured in accordance with good manufacturing practices, so that under normal or foreseeable conditions of use, they do not transfer their constituents to food in quantities which could:
endanger human health; or
bring about an unacceptable change in the composition of the food; or
bring about a deterioration in the organoleptic characteristics thereof"

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. Where no specific migration limit (SML) exists for a specific component then the following migration limits apply:

a. "A target migration limit of no concern for non-evaluated substances of 10 ppb is the ultimate objective, to be consistent with other food contact materials.

b. In particular, a substance is acceptable if its specific migration does not exceed:
10 ppb, in case of insufficient toxicological data
50 ppb if three negative mutagenicity tests requested by EFSA4 Guidelines are available
above 50 ppb, if supported by favorable toxicological data and/or evaluation done in c. accordance with the EFSA Guidelines" (Extract from EuPIA Guideline on Printing Inks applied to the non-food contact surface of food packaging materials and articles, September 2009).

EUPIA also provides guidelines on how to measure the potential level of migratables arising from printed matter. For inks and coatings applied to the non-food contact surface of packaging (i.e. the outer surface), whether that be to the primary packaging or secondary packaging (labels and sleeves) then the most likely route for migratable species from the ink contaminating the foodstuff is by what is known as set-off migration. This is where printed matter is stacked or reeled prior to it being filled with food. Thus, the ink comes into contact with what will be the food-contact surface of the package and migratable components of the ink can diffuse into this surface. When the package is then filled with foodstuff, the contaminants from the ink which have diffused into the contact-surface of the package can then leach into the food causing a potential contamination issue.

Thus, any energy-curable fluid which is applied to either the primary or secondary packaging of foodstuff should not result in contamination of that foodstuff at levels exceeding the limits detailed above.

EXAMPLES

The following examples illustrate specific aspects of the present invention and are not intended to limit the scope thereof in any respect and should not be so construed.

Preparation of Aminoacrylates

The aminoacrylates prepared for the inventive and comparative examples were synthesized in a similar fashion. For each preparation, a total combined weight of acrylate monomer and amine of 100 g was used. To a round-bottomed flask equipped with an overhead stirrer the acrylate monomer was charged first. Whilst stirring the acrylate monomer, the amine was added slowly over a 20 minute period. After the initial reaction exotherm had subsided (typically the exotherm raised the reactor contents by about 10-15° C.) the reactor contents were heated to 50° C. whilst maintaining stirring. The temperature was maintained at 50° C. for 2 hours before the product was discharged from the reactor.

Ink Preparation

The inks were prepared by mixing the aminoacrylates with the pigment dispersion and other ink components using a Silverson type disperser for 20 minutes. The inks are suitable for inkjet printing and were prepared according to the principles laid out in WO 2014/126720, based on difunctional acrylate monomers and a low migration photoinitiator package comprising a limited concentration of polymeric photoinitiator.

Viscosity Measurements

The viscosities of the inks were measured at 45° C. using a Brookfield DV-II+ Pro Viscometer equipped with Spindle no. 18, at 100 rpm.

Curing the Inks For Extraction Testing

The inks were applied to 36 μm Melinex S (a polyester film) at print film thickness of 12 μm, and then cured at 200 mJ/cm$^2$, using a Fusion UV Systems UV-Rig equipped with a medium pressure H-bulb. The belt speed was adjusted to deliver the required UV-dose of 200 mJ/cm$^2$, as measured by a calibrated International Light Technologies ILT 490 Profiling Belt Radiometer (covering the UV-A and UV-B ranges).

Assessing the Level of Extractable Monomer and Photoinitiator Residues

The level of unbound, unreacted monomer in a print was determined by a 'total extraction' test. This test involved soaking 30 cm$^2$ of the print in 2 ml of methanol, containing 0.025% (w/w) of MEHQ (stabilizer) for 24 hours at room temperature before the methanol solution was analyzed by GC-MS. The GC-MS was calibrated with known solutions of the monomers and photoinitiator products and the results are reported as ppb, the equivalent amount of monomer that would be present in 1 Kg of food according to the EU packaging model (where it is assumed that 600 cm$^2$ of substrate is required to package 1 Kg of food) if all the unbound monomer in the print were to migrate into and contaminate the food.

Assessing the Odor of Cured Inks

Ink prints prepared according to the method described for extraction and migration testing were assessed for their odor. For this, 5 prints of each ink were prepared and then the coated PET films were stacked on top of each other. After 24 hours, prints from the middle of the stack were taken and assessed for odor. A score of 1 to 6 was assigned to each print, where 1 denotes insignificant odor and 6 denotes a strong unpleasant odor emanating from the print.

Example 1. General Formulation of Inks

All inks were prepared according to the general formulation in Table 1. The acrylated amine in each ink is as described in Examples 2 to 4.

TABLE 1

| General formulation of inks | |
|---|---|
| Material | % |
| VEEA | 30.0 |
| 3-MePDDA | 25.0 |
| DPGDA | 21.8 |
| Acrylated Amine | 7.5 |
| Irgacure 819 | 0.6 |
| KIP160 | 2.0 |
| Esacure One | 2.0 |
| Omnipol TX | 1.5 |
| TegoGlide 410 | 0.4 |
| Ethanox | 0.2 |
| Cyan Dispersion | 9.0 |
| Total | 100.0 |

The materials used are the following:
VEEA=2-(2-vinyloxyethoxy)ethyl acrylate
3-MePDDA=3-Methylpentanediol diacrylate
DPGDA=Dipropylene glycol diacrylate
Irgacure 819=Photoinitiator (ex. BASF)
Esacure KIP160=Photoinitiator (ex. IGM Resins)

Esacure One=Photoinitiator (ex. IGM Resins)
Omnipol TX=Polymeric Thioxanthone (ex. IGM Resins)
Ethanox 4703=Stabilizer (ex. Albemarle)
TegoGlide 410=Slip Aid (ex. Evonik)
Cyan Dispersion=a dispersion containing 25.0% (w/w) of Pigment Blue 15:4, the remainder comprising the dispersant (Efka 7476), stabilizers and NPG(PO)DA
NPG(PO)DA=Propoxylated neopentylglycol diacrylate (degree of propoxylation=2)

As shown in Table 1, the majority of the ink compositions consists of the low molecular weight, difunctional monomers VEEA, 3-MePDDA, DPGDA and NPG(PO)DA. Not only do these monomers have molecular weights less than 1000 Daltons, they all have molecular weights considerably lower than 500 Daltons (VEEA=186, DPGDA=242, 3-MePDDA=226, NPG(PO)DA=328 (typically)). It is therefore a further aspect of the invention that compositions comprise greater than 10% (w/w) of monomers whose molecular weight is less than 350, and preferably less than 300. A further aspect of the invention evident from the examples encompasses those compositions having greater than 50% (w/w) of monomers whose molecular weight is less than 1000, and more preferably lower than 500 Daltons.

Example 2. Formulation and Testing of Inks C1 to C4 Based on Commercially Available aminoacrylates The formulations of comparative inks C1 to C4 are shown in Table 2, along with measured viscosity, an assessment of odor, and the amount of extractable monomers. Inks C1 to C4 were prepared with commercially available aminoacrylates which are suitable for the preparation of low migration energy-curable compositions.

TABLE 2

| | | | | | Inks C1 to C4 | | | |
|---|---|---|---|---|---|---|---|---|
| Ink | Amino-acrylate | | Viscosity (mPa·s) | Odor | Extractables (ppb) | | | |
| | | | | | NPG(PO)DA | DPGDA | 3-MePDDA | VEAA |
| C1 | CN3715LM | | 6.4 | 5 | 260 | 160 | 122 | 270 |
| C2 | LEO 10551 | | 6.2 | 4 | 342 | 152 | 138 | 73 |
| C3 | LEO 10552 | | 6.9 | 3 | 123 | 50 | 44 | 22 |
| C4 | LEO 10553 | | 6.5 | 4 | 470 | 285 | 250 | 135 |

Notes:
CN3715LM = Aminoacrylate, ex. Sartomer
LEO 10551 = Ebecryl LEO10551, ex. Allnex
LEO 10552 = Ebecryl LEO10552, ex. Allnex
LEO 10553 = Ebecryl LEO10553, ex. Allnex As can be seen in Table 2, inks made with commercially available aminoacrylates have strong odor, and high amounts of extractable monomers.

Example 3. Formulation and Testing of Inks 1 to 5 and C5 to C7 Comprising aminoacrylates Based on ethoxylated trimethylolpropane triacrylate Inks 1 to 5 and C5 to C7 were prepared with aminocrylates synthesized from ethoxylated trimethylolpropane triacrylates, according to the previously described procedure. The formulations and test results are shown in Table 3. The inks are described in terms of the average degree of ethoxylation per acrylate group (n), the amine used in the Michael addition reaction, and the theoretical amine value of the aminoacrylate (mg KOH/g).

TABLE 3

| | | | | Inks 1 to 5 and C5 to C7 | | | | |
|---|---|---|---|---|---|---|---|---|
| Ink | n | Amine | Amine Value (mg KOH/g) | Viscosity (mPa·s) | Odor | Extractables (ppb) | | |
| | | | | | | NPG(PO)DA | DPGDA | 3-MePDDA | VEEA |
| C5 | 1 | DiEtAm | 50 | 6.2 | 5 | 285 | 180 | 155 | 76 |
| C6 | 1 | DiPrAm | 50 | 6.2 | 4 | 330 | 175 | 145 | 79 |
| C7 | 1 | EtOAm | 50 | 7.6 | 3.5 | 110 | 53 | 42 | 19 |
| 1 | 2 | EtOAm | 50 | 7.9 | 2.5 | 31 | 17 | 10 | 8 |
| 2 | 3 | EtOAm | 50 | 9.3 | 2.5 | 20 | 13 | 6 | 9 |
| 3 | 3 | DiEtOAm | 50 | 7.4 | 2.5 | 11 | 9 | 6 | 8 |

TABLE 3-continued

Inks 1 to 5 and C5 to C7

| Ink | n | Amine | Amine Value (mg KOH/g) | Viscosity (mPa · s) | Odor | Extractables (ppb) | | | |
|---|---|---|---|---|---|---|---|---|---|
| | | | | | | NPG(PO)DA | DPGDA | 3-MePDDA | VEEA |
| 4 | 5 | DiPrAm | 50 | 6.8 | 4 | 92 | 61 | 49 | 37 |
| 5 | 5 | BuAm | 50 | 30 | 2.5 | 14 | 10 | 7 | 10 |

Notes:
DiEtAm = Diethylamine
DiPrAm = Dipropylamine
EtOAm = Ethanolamine
DiEtOAm = Diethanolamine
BuAm = Butylamine
n = Average degree of Ethoxylation per acrylate group The data in Table 3 clearly demonstrates a number of features of the current invention. Firstly, inventive ink 1 compared with comparative ink C7 shows that as the average degree of ethoxylation per acrylate increases from 1 to 2 there is a significant reduction in the amount of unreacted monomer in the cured ink film. Secondly, as the degree of ethoxylation increases (inventive inks 2 and 3) there is a further lowering in the amount of unreacted monomer. Furthermore, inventive inks 1 to 3 produce lower print odor than comparative ink C7. Comparing inks C5 and C6, with C7, demonstrates that aminocrylates based on ethanlolamine produce lower levels of uncured monomer. Ink 3 compared with ink 2 shows that an aminoacrylate based on the monoreactive diethanolamine is at least as effective as one based on ethanolamine in reducing the amount of uncured monomer. This is a particularly important finding as it indicates that the reduction in uncured monomer is not solely due to the increase in functionality arising from the product of the trifunctional acrylate monomer with the bireactive ethanolamine. To expand on this, the reaction product of 2 moles equivalent of an ethoxylated trimethylolpropane triacrylate with 1 mole equivalent of ethanolamine would result in an average molecule having 4 acrylate groups as well as a non-terminal amine synergist, according to the following structure:

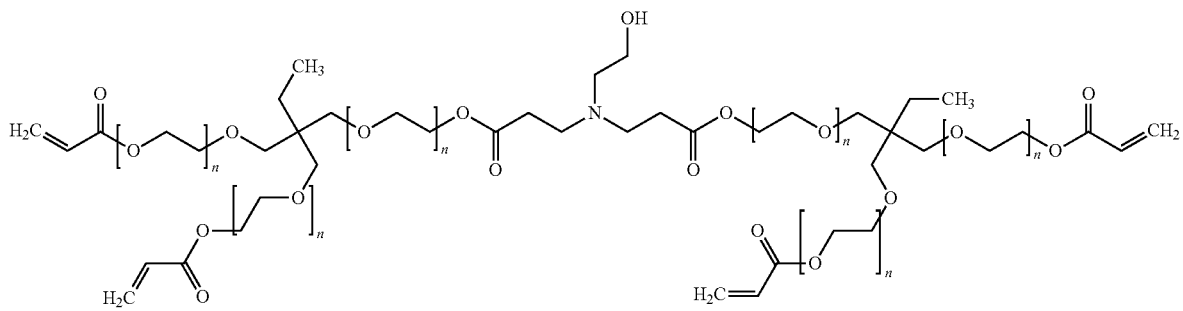

When an ethoxylated trimethylolpropane triacrylate is reacted with a monoreactive amine such as diethanolamine, diethylamine or dipropylamine, there is an equimolar reduction of acrylate functionality in the Michael addition product. The following structure provides the average product for the equimolar reaction product with diethylamine;

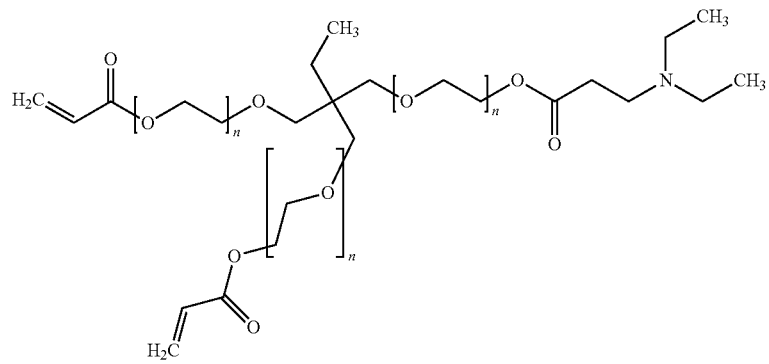

Thus, based purely on the acrylate functionality of the product it might be anticipated that inventive ink 2 would produce lower levels of uncured monomer than inventive ink 3.

A further finding from Table 3 is that all the inventive inks, except inventive ink 4, produce considerably lower levels of uncured monomer than is achieved with any of the comparative inks (i.e. C5 to C7) comprising the commercial aminoacrylates. This further demonstrates the usefulness of the present invention in delivering higher levels of monomer conversion during UV-curing, or other forms of energy-curing.

It is clear from Table 3 that both higher degrees of alkoxylation in the backbone allied with preferred amines, such as alkanolamines, result in aminoacrylates that when incorporated into compositions according to the current invention produce increased levels of monomer conversion during energy (UV) curing, with a resultant reduction in the amount of uncured, migratable monomers in the cured ink.

Example 4. Formulation and Testing of Inks 6 to 12 Based on poly(ethylene glycol) diacrylates Table 4 provides the details of ink examples 6 to 12, comprising aminoacrylates from the Michael reaction of poly(ethylene glycol) diacrylates (PEGDAs) with bireactive amines, including ethanolamine and piperazine. The examples are described in terms of the PEGDA, the amine, and theoretical amine value of the aminoacrylate.

TABLE 4

| | Ink 6 | Ink 7 | Ink 8 | Ink 9 | Ink 10 | Ink 11 | Ink 12 |
|---|---|---|---|---|---|---|---|
| PEGDA | 200 | 200 | 200 | 400 | 400 | 400 | 600 |
| Amine | EtOAm | EtOAm | EtOAm | EtOAm | EtOAm | Pip | EtOAm |
| Amine value (mg KOH/G) | 50 | 75 | 100 | 50 | 75 | 50 | 50 |
| Viscosity (mPa · s) | 6.6 | 6.9 | 8.9 | 7.7 | 9.8 | 8.2 | 9.5 |
| Odor | 2.5 | 2.5 | 2 | 3 | 2.5 | 2 | 3 |
| Extractable NPG(PO)DA (ppb) | 19 | 40 | 11 | 45 | 15 | 12 | 30 |
| Extractable DPGDA (ppb) | 12 | 26 | 7 | 20 | 8 | 9 | 18 |
| Extractable MePDDA (ppb) | 7 | 13 | 4 | 10 | 4 | 5 | 15 |
| Extractable VEEA (ppb) | 8 | 13 | 5 | 12 | 7 | 9 | 12 |

Notes:
PEGDA - Defined in terms of the molecular weight of the PEG core
Pip = Piperazine All the inventive inks (i.e. inks 6 to 12) comprising the PEGDA-derived aminoacrylates produced levels of uncured monomer significantly less than that achieved with any of the comparative examples. This reinforces the notion that a key feature of the invention is the use of aminoacrylates comprising poly(alkylene oxide) chains where the degree of alkoxylation is greater than 2 per acrylate group of the parent acrylate monomer. And, again, the use of an alkanolamine in the preparation of the aminoacrylate used in the inventive compositions of Table 4 would seemingly also contribute to a lowering in the level of uncured monomer after UV-curing, even though the aminoacrylate product is only difunctional with respect to the number of acrylate groups. The structures for the products of PEGDA with ethanolamine or piperazine are depicted in the diagrams below.

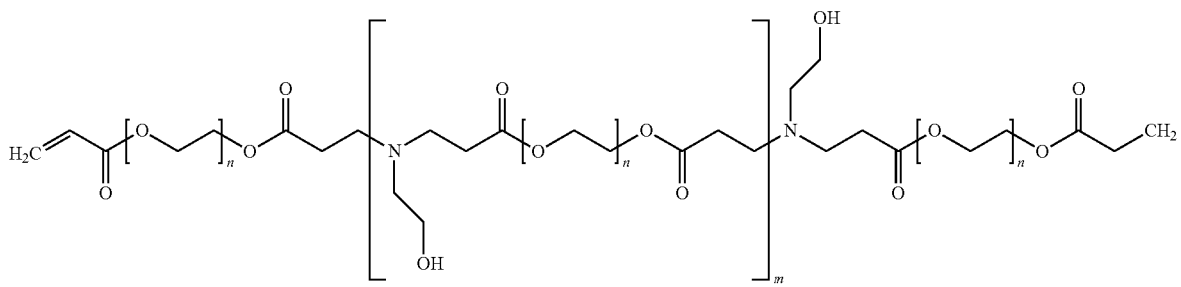

Aminoacrylates used in inks 6, 7, 8, 9, 10 and 12

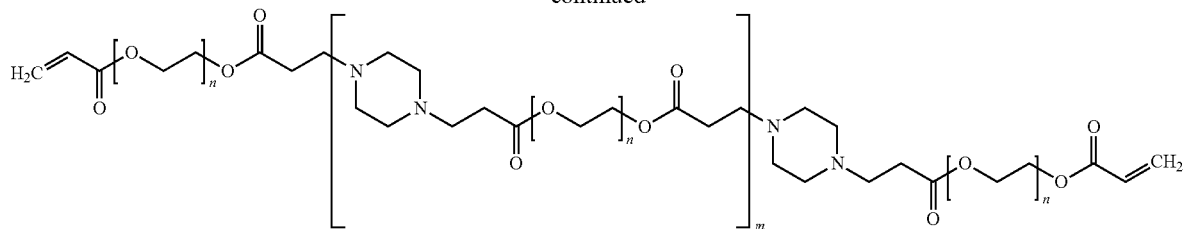

Aminoacrylate used in ink 11

Thus, the present examples show that ink or coating compositions comprising aminoacrylates prepared by the Michael addition reaction of highly alkoxylated monomers and mono- or bireactive amines exhibit improved cure, with a resultant decrease in the amount of uncured, migratable monomers in the cured ink or coating.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An energy curable composition comprising:
   a) greater than 10% w/w of one or more low molecular weight monomers having molecular weights of less than 1000 Daltons, and at least one polymerizable group,
   b) 0.5% to 50% w/w one or more aminoacrylates that are the Michael reaction products of polymerizable alkoxylated acrylated monomers or oligomers, with primary and/or secondary amines;
   wherein:
      i. the alkoxylated acrylate monomers or oligomers have at least one alkoxylated chain, and at least 2 polymerizable groups per molecule; and the degree of alkoxylation per polymerizable group is greater than or equal to 2;
      ii. the primary and/or secondary amine is selected from the group consisting of alkylamines, alkanolamines, and cyclic amines, and combinations thereof; wherein each alkylamine, alkanolamine, and cyclic amine independently comprises one secondary amine, one primary amine, or two secondary amines;
      iii. wherein an excess of alkoxylated acrylate monomers or oligomers, with respect to the molar concentration of acrylate groups, compared to the primary and/or secondary amine is used in the Michael reaction; and
      iv. wherein the aminoacrylate that is the product of the Michael reaction has the general formula:

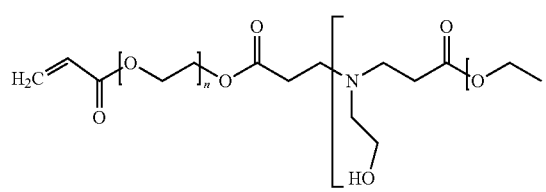

or

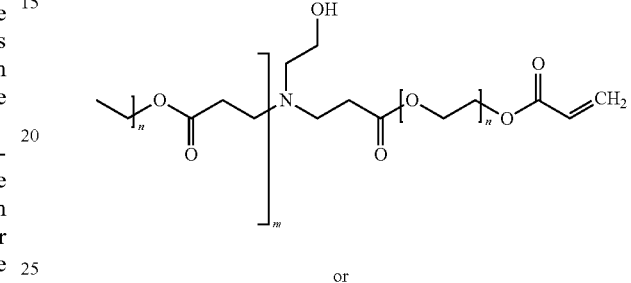

or

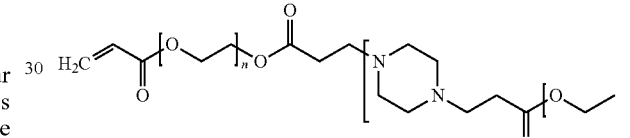

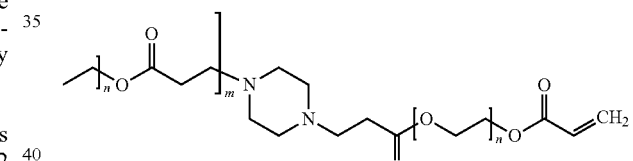

or

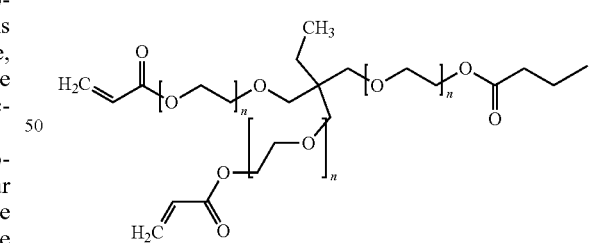

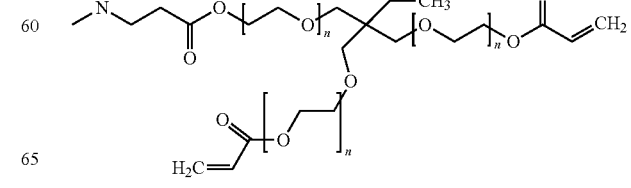

or

-continued

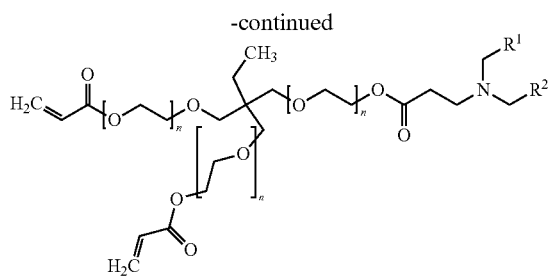

wherein:

n is an integer 2 to 45;

m is 0 or an integer greater than or equal to 1; and $R^1$ and $R^2$ are each independently selected from H, $CH_3$, $C_2H_5$, $C_3H_7$, and $CH_2OH$.

2. The composition according to claim 1, wherein the polymerizable alkoxylated acrylate monomer or oligomer used in the preparation of the aminoacrylate is an acrylate adduct of the alkoxylated derivative of trimethylol propane or ethylene glycol.

3. The composition according to claim 1, wherein the amine used to prepare the aminoacrylate is an alkanolamine or a piperazine.

4. The composition according to claim 3, wherein the alkanolamine is ethanolamine or diethanolamine.

5. The composition according to claim 1, wherein the aminoacrylate has an amine value of equal to or greater than 40 mg KOH/g.

6. The composition according to claim 1, wherein the aminoacrylate is present in an amount of 1% to 45% w/w.

7. The composition according to 1, which comprises greater than 25% w/w of low molecular weight monomers having molecular weights of less than 1000 Daltons.

8. The composition according to claim 1, wherein at least one low molecular weight monomer has a molecular weight less than 500 Daltons.

9. The composition according to claim 1, wherein at least one of the low molecular weight monomers is polyfunctional with respect to the polymerizable group.

10. The composition according to claim 1, wherein at least one low molecular weight monomer is 2-(2-vinyloxyethoxy) ethyl acrylate.

11. The composition according to claim 1, further comprising one or more additives selected from the group consisting of one or more monofunctional monomers, one or more solvents, and/or one or more photoinitiators.

12. The composition according to claim 11, wherein the at least one monofunctional monomers are present in an amount of less than 10% w/w; and/or wherein the at least one solvents are present in an amount of less than 10% w/w; and/or wherein the at least one photoinitiators are present in an amount of 0.5% to 15% w/w.

13. The composition according to claim 11, wherein one or more of the photoinitiators are selected from the group consisting of polymeric, polymerizable, or multifunctional photoinitiators.

14. The composition according to claim 1, which is a printing ink or coating.

15. The composition according to claim 14, wherein the printing ink or coating is an inkjet fluid.

16. The composition according to claim 1, wherein when the composition is applied to a polyester film at a print film thickness of 12 μm, and cured at 200 mJ/cm² to provide a cured composition, the amount of migration of uncured monomer out of the cured composition is less than or equal to 50 parts per billion.

17. An article comprising the composition of claim 1.

18. The article according to claim 17, wherein the article is a food packaging article.

19. A method of reducing the amount of migratable monomer in a cured ink or coating composition comprising:
a) applying the composition of claim 1 on a substrate; and
b) curing the composition applied on the substrate.

20. A process for preparing an article with a low migration ink or coating comprising:
a) applying the composition of claim 1 on a surface of an article; and
b) curing the composition applied on the surface of the article.

21. The composition of claim 1, wherein the primary and/or secondary amine does not contain a tertiary amine.

22. The composition of claim 1, wherein each primary and/or secondary amine is independently selected from the group consisting of diethylamine, dipropylamine, dibutylamine, diisobutylamine, ethylamine, propylamine, ethanolamine, propanolamine, diethanolamine, N-methylethanolamine, piperazine, and combinations thereof.

23. An energy curable composition, comprising:
a) greater than 10% w/w of one or more low molecular weight monomers having molecular weights of less than 1000 Daltons, and at least one polymerizable group,
b) 0.5% to 50% w/w one or more aminoacrylates that are the Michael reaction products of polymerizable alkoxylated acrylated monomers or oligomers, with primary and/or secondary amines;
wherein:
  i. the alkoxylated acrylate monomers or oligomers have at least one alkoxylated chain, and at least 2 polymerizable groups per molecule; and the degree of alkoxylation per polymerizable group is greater than or equal to 2;
  ii. the primary and/or secondary amine is selected from the group consisting of alkylamines, alkanolamines, and cyclic amines, and combinations thereof wherein each alkylamine, alkanolamine, and cyclic amine independently comprises one secondary amine, one primary amine, or two secondary amines;
  iii. wherein an excess of alkoxylated acrylate monomers or oligomers, with respect to the molar concentration of acrylate groups, compared to the primary and/or secondary amine is used in the Michael reaction; and
  iv. wherein the aminoacrylate that is the product of the Michael reaction has the general formula:

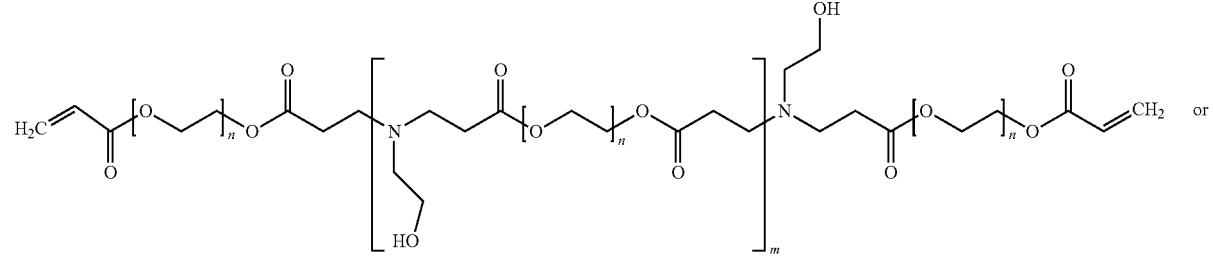

or

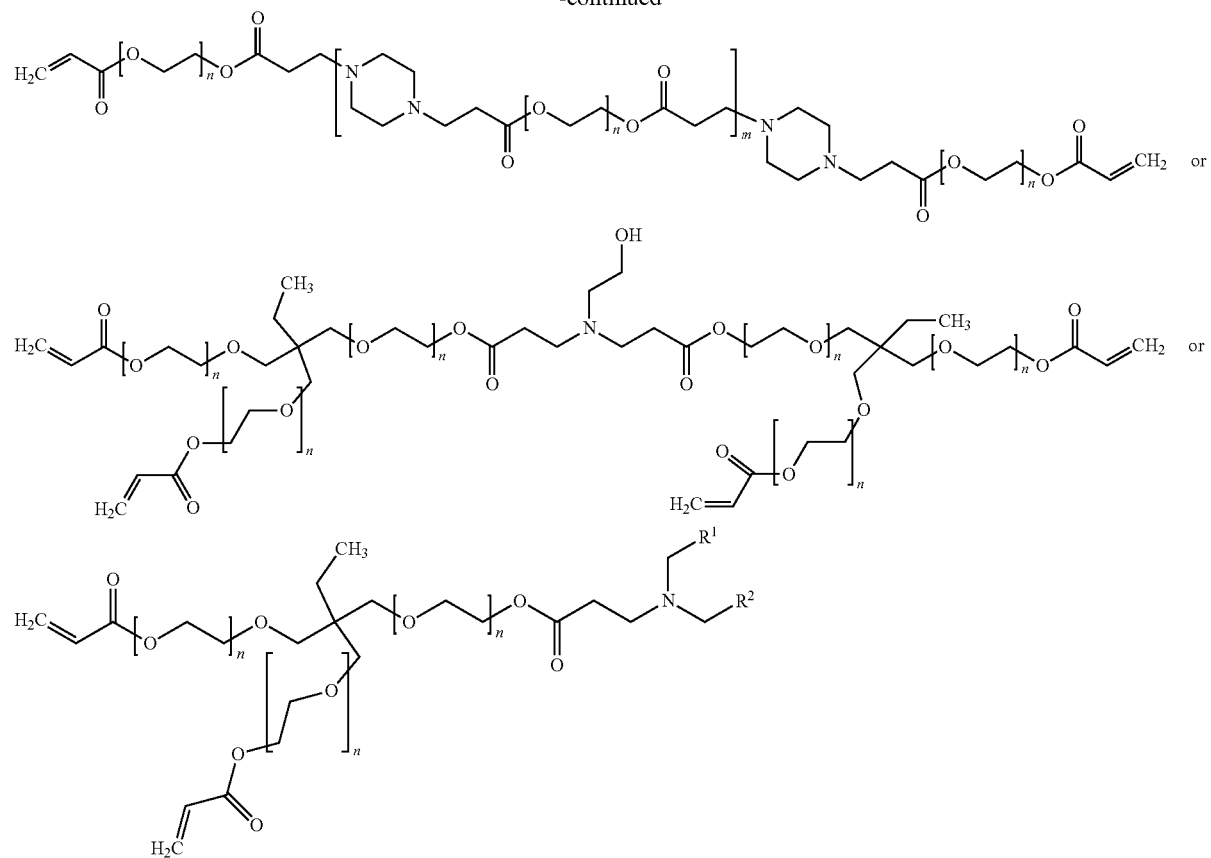
wherein:
n is an integer 2 to 45; and
m is 0 or an integer greater than or equal to 1.
* * * * *